(12) United States Patent
Wood et al.

(10) Patent No.: US 9,165,734 B2
(45) Date of Patent: Oct. 20, 2015

(54) ELECTRO-MECHANICAL ACTUATOR DEVICE AND APPARATUS INCORPORATING SUCH DEVICE

(75) Inventors: David Wood, Durham (GB); Belen Pilar Solano Hermosilla, Durham (GB); Mary Herbert, Newcastle Upon Tyne (GB)

(73) Assignee: University Of Durham, Durham (GB)

(*) Notice: Subject to any disclaimer, the term of this patent is extended or adjusted under 35 U.S.C. 154(b) by 2026 days.

(21) Appl. No.: 12/302,220

(22) PCT Filed: May 23, 2007

(86) PCT No.: PCT/GB2007/001901
§ 371 (c)(1),
(2), (4) Date: Mar. 9, 2009

(87) PCT Pub. No.: WO2007/138266
PCT Pub. Date: Dec. 6, 2007

(65) Prior Publication Data
US 2010/0058899 A1    Mar. 11, 2010

(30) Foreign Application Priority Data
May 25, 2006    (GB) .................................. 0610392.3

(51) Int. Cl.
*H01H 35/00*        (2006.01)
*H01H 37/00*        (2006.01)
(Continued)

(52) U.S. Cl.
CPC ................ *H01H 35/00* (2013.01); *F03G 7/06* (2013.01);
(Continued)

(58) Field of Classification Search
CPC   Y10T 307/773; Y10T 307/786; H01H 35/00; H01H 37/00; H01H 37/72; H01H 37/74; H01H 2221/00; H01H 221/09
USPC .................................................. 307/117, 119
See application file for complete search history.

(56) References Cited

U.S. PATENT DOCUMENTS

| 5,727,915 A * | 3/1998 | Suzuki ............................ 414/1 |
| 6,545,391 B1 | 4/2003 | Su et al. ........................ 310/332 |

(Continued)

FOREIGN PATENT DOCUMENTS

| EP | 1316977 A2 | 6/2003 | ............... H01H 1/00 |
| WO | 02/23565 A2 | 3/2002 | |
| WO | 02/23565 A3 | 3/2002 | ............... B81B 3/00 |

*Primary Examiner* — Carlos Amaya
(74) *Attorney, Agent, or Firm* — Zilka-Kotab, PC

(57) ABSTRACT

A microgripper (2) comprises a pair of opposed actuator devices (4, 6) connected to an electronic control unit (8). Each actuator (4, 6) includes an actuator body 10 of transparent flexible epoxy based photoresist material forming a "hot" arm (12) and a "cold" arm (14) joined together at their ends, and an electrical heating element wire (18) is embedded in the "hot" arm (12). A gripper arm (32) extends from the substrate and has a gripping portion (34) such that the gripper portions of the two gripper arms (32) face each other. When electrical current is supplied to the heating element (18), electrical heating of the "hot" arm (12) occurs, as a result of which thermal expansion of the "hot" arm (12) causes its length to become greater than that of the "cold" arm (14). Because the "hot" and "cold" arms (12, 14) are joined together at their ends, the increased length of the "hot" arm (12) as a result of its thermal expansion causes the actuator bodies (10) to flex, as a result of which the gripper portions (34) of the gripper arms (32) move closer together.

20 Claims, 5 Drawing Sheets

(51) Int. Cl.
*H01H 37/72* (2006.01)
*H01H 37/74* (2006.01)
*F03G 7/06* (2006.01)
*H01H 61/02* (2006.01)
*H01H 61/00* (2006.01)

(52) U.S. Cl.
CPC ............... *H01H 37/00* (2013.01); *H01H 37/72* (2013.01); *H01H 37/74* (2013.01); *H01H 61/02* (2013.01); *H01H 2061/008* (2013.01); *Y10T 29/49155* (2015.01); *Y10T 307/773* (2015.04); *Y10T 307/786* (2015.04)

(56) References Cited

U.S. PATENT DOCUMENTS

| | | | |
|---|---|---|---|
| 6,575,965 B1 * | 6/2003 | Fitch et al. | 606/15 |
| 6,679,055 B1 | 1/2004 | Ellis | 60/527 |
| 6,691,513 B1 | 2/2004 | Kolesar | |
| 2003/0117257 A1 | 6/2003 | Cunningham | 338/200 |
| 2003/0200749 A1 | 10/2003 | Bromley et al. | 60/527 |
| 2004/0261412 A1 | 12/2004 | Hickey | 60/527 |
| 2005/0029827 A1 * | 2/2005 | Hashiguchi et al. | 294/86.4 |
| 2006/0238279 A1 * | 10/2006 | Lu et al. | 335/78 |

\* cited by examiner

ELECTRO-MECHANICAL ACTUATOR DEVICE AND APPARATUS INCORPORATING SUCH DEVICE

The present application claims the priority of a United Kingdom patent application filed May 25, 2006 under application number 0610392.3, which is incorporated herein by reference.

The present invention relates to electro-mechanical actuator devices and to apparatus incorporating such actuator devices. The invention relates particularly, but not exclusively, to electro-mechanical microgrippers incorporating such actuator devices for manipulating cells. The invention also relates to a method of manufacturing such actuator devices.

Electro-mechanical microgrippers for manipulating single cells are known which consist of a pair of so called "hot and cold arm" actuators placed anti-symmetrically next to each other. Each actuator comprises a pair of electrically conductive arms of different cross sectional areas. A first end of each arm is attached to a substrate, and the second ends of the arms are attached together. The so-called "hot" arm has a smaller cross sectional area than the "cold" arm, as a result of which it has a higher electrical resistance. This results in greater electrical heating and thermal expansion of the "hot" arm than the "cold" arm. Because the arms are joined to the substrate at their first ends and are joined together at their second ends, the second ends of the arms move in an arcing motion towards the "cold" arm. By having a pair of opposed actuators, each of which has a gripper arm mounted to its end, the gripper arms can be moved towards or away from each other by the application of electrical heating current to the actuators.

Microgrippers of this type suffer from the drawback that because both the "hot" and "cold" arms are electrically heated, it is difficult to maximize the temperature difference between the two arms, as a result of which operation of the microgripper is inefficient. Also, because the bulk material of the arms is heated (i.e. the entire "hot" and "cold" arms carry electrical current), the actuators have high power consumption, and therefore generally require higher operating voltages. This can often have disadvantageous consequences in applications where the microgripper is being used in biological fluid environments.

Electro thermal actuators are disclosed in U.S. Pat. No. 6,691,513 in which two "hot" arms and a single "cold" arm are provided. A first end of each arm is attached to a substrate, and the second ends of the arms are attached together, so that one of the "hot" arms provides an outward path for electrical heating current, the other "hot" arm forms a return path for the current, and the "cold" arm is not electrically heated. Because electrical heating of the "cold" arm is not necessary, and the efficiency of operation of the actuator is improved, the power consumption of the actuator is decreased.

However, this device suffers from the disadvantage that as the two "hot" arms expand and flex, it is difficult to control the position of the two "hot" arms during flexing, as a result of which the "hot" arms can touch each other and cause short-circuiting or malfunctioning of the actuator. For example, a gripper may inadvertently snag on an object being manipulated, causing large deflection of the gripper jaws. This can cause malfunctioning of the arrangement having two "hot" arms.

Preferred embodiments of the present invention seek to overcome the above disadvantages of the prior art.

According to an aspect of the present invention, there is provided an actuator device comprising:

an actuator body including an elongate first portion and a second portion; and at least one electrical heater device provided on said first portion and including at least one first electrically conductive element extending at least partially along said first portion and having first and second conductive limbs connected to each other adjacent respective first ends thereof and adapted to conduct electrical current between respective second ends thereof, wherein flow of electrical current in at least one said electrical heater device in use heats said first portion such that thermal expansion of said first portion causes said first portion to increase in length more than said second portion, and said first portion and said second portion are joined together adjacent at least respective first ends thereof such that thermal expansion of said first portion causes flexing of said actuator body towards said second portion.

By providing at least one electrically conducting element having limbs connected together adjacent respective ends thereof, this provides the advantage of enabling single "hot" arm to be used and an unheated "cold" arm, which maximizes the temperature difference between the "hot" and "cold" arms to maximize efficiency of operation of the device, whilst also minimizing the risk of the two limbs of the element coming into contact with each other as a result of uncontrolled flexing of a pair of "hot" arms. This in turn enables the displacement of the actuator device in operation to be maximized, as a result of which it can be used to construct a microgripper operating over a large range of sizes of manipulated cells. In addition, by providing a single "hot" arm, the risk of malfunctioning of a microgripper incorporating the apparatus is minimized in the event of an excessively large gripper jaw deflection. A further advantage of the present invention is the possibility of using an insulating material to form the actuator body. This enables devices such as piezoresistors to be incorporated into the actuator body to measure the flexural stress generated in the actuator body.

The actuator body may be at least partially transparent.

This provides the advantage of greater visibility and ease of use in cell manipulation applications.

The actuator body may be formed from a flexible material.

This provides the advantage of spreading stresses evenly throughout the actuator body during flexing thereof, which in turn reduces the risk of fracture of the substrate or damage to any cells being manipulated by the device.

The actuator body may include epoxy based photoresist material.

This provides the advantage of enabling a flexible, transparent and chemically inert actuator body to be manufactured, while also enabling the thickness of the actuator body to be controlled.

The device may further comprise at least one calibration device for providing an output signal dependent upon the degree of flexing of said actuator body.

This provides the advantage of enabling the output signal to be used to control operation of a microgripper incorporating the actuator device.

The at least one calibration device may include at least one second electrically conductive element having an electrical resistance dependent upon the degree of flexing of the actuator body.

At least one said second electrically conductive element may be mounted adjacent a proximal end of said second portion.

Since the flexural stress, and therefore the change in resistance of the second electrically conductive element, will be a maximum adjacent the second end of the second portion, this provides the advantage of enabling maximum sensitivity of the at least one calibration device.

At least part of at least one said electrical heater device may be embedded in said actuator body.

This provides the advantage of minimizing the risk of short-circuiting of the device when used in biological fluid environments.

The device may further comprise at least one gripper arm extending from said actuator body.

The device may further comprise at least one insert on a respective said gripper arm.

This provides the advantage of enabling the material of the insert to be compatible with a cell or other object being manipulated.

According to another aspect of the present invention, there is provided a gripper device comprising a plurality of actuator devices as defined above wherein said gripper arms are adapted to grip an object therebetween, and the distance between ends of said gripper arms remote from the actuator bodies is adjustable by means of application of electrical signals to at least one said actuator device.

The device may further comprise at least one current applying device for applying an electrical current to an object gripped between said gripper arms.

This provides the advantage of enabling an electrical pulse to be delivered to a cell gripped between the gripper arms, which enables a biological reaction to be induced in the cell.

At least one current applying device may comprise a respective electrically conductive track connected to each said gripper arm.

The device may further comprise at least one light guide device for directing a light signal onto an object gripped between said gripper arms.

At least one light guide device may comprise at least one optical fibre mounted to at least one said gripper arm.

This enables a biological reaction to be induced in, or a hole created in, a cell gripped between the gripper arms.

According to a further aspect of the present invention, there is provided an electrical switch device comprising:

at least one pair of switching elements, wherein each said switching element includes a actuator body adapted to flex when an electrical current is applied to said actuator, and at least one electrical contact element mounted to said actuator body and connected to a respective terminal for receiving electrical signals, wherein the electrical contact elements of each pair are arranged relative to each other such that said contact elements contact each other to allow conduction of electrical signals between the terminals of said pair only if one of said actuator bodies flexes before the other.

This provides the advantage of enabling a particularly secure lock to be made.

At least one said switching element may include an actuator device as defined above.

The electrical switch device may further comprise a plurality of said pairs of switching elements, and at least one control device for preventing actuation of at least one said pair of switching elements until at least one further said pair of switching elements is actuated.

This provides the advantage of enabling further security of operation of a lock incorporating the switching device by including sequentially actuated pairs of switching elements.

According to a further aspect of the present invention, there is provided a method of manufacturing an actuator device as defined above, the method comprising:

forming a first layer of actuator body material on a substrate;

forming at least one electrical heater device on said first layer;

forming a second layer of actuator body material on at least one said electrical heater device; and separating said substrate and said first layer.

This provides the advantage, by suitable choice of materials, of enabling a flexible, transparent actuator body encapsulating an electrical heater element (apart from the ends of the electrical heater element) to be produced.

The method may further comprise forming a release layer on said substrate prior to formation of said first layer.

This provides the advantage of assisting separation of the substrate and first layer.

The release layer may be adapted to adhere to polymer materials.

The step of separating said substrate and said first layer may include removal of at least part of said substrate by means of etching.

Preferred embodiments of the invention will now be described, by way of example only and not in any limitative sense, with reference to the accompanying drawings, in which.

Figure 1:
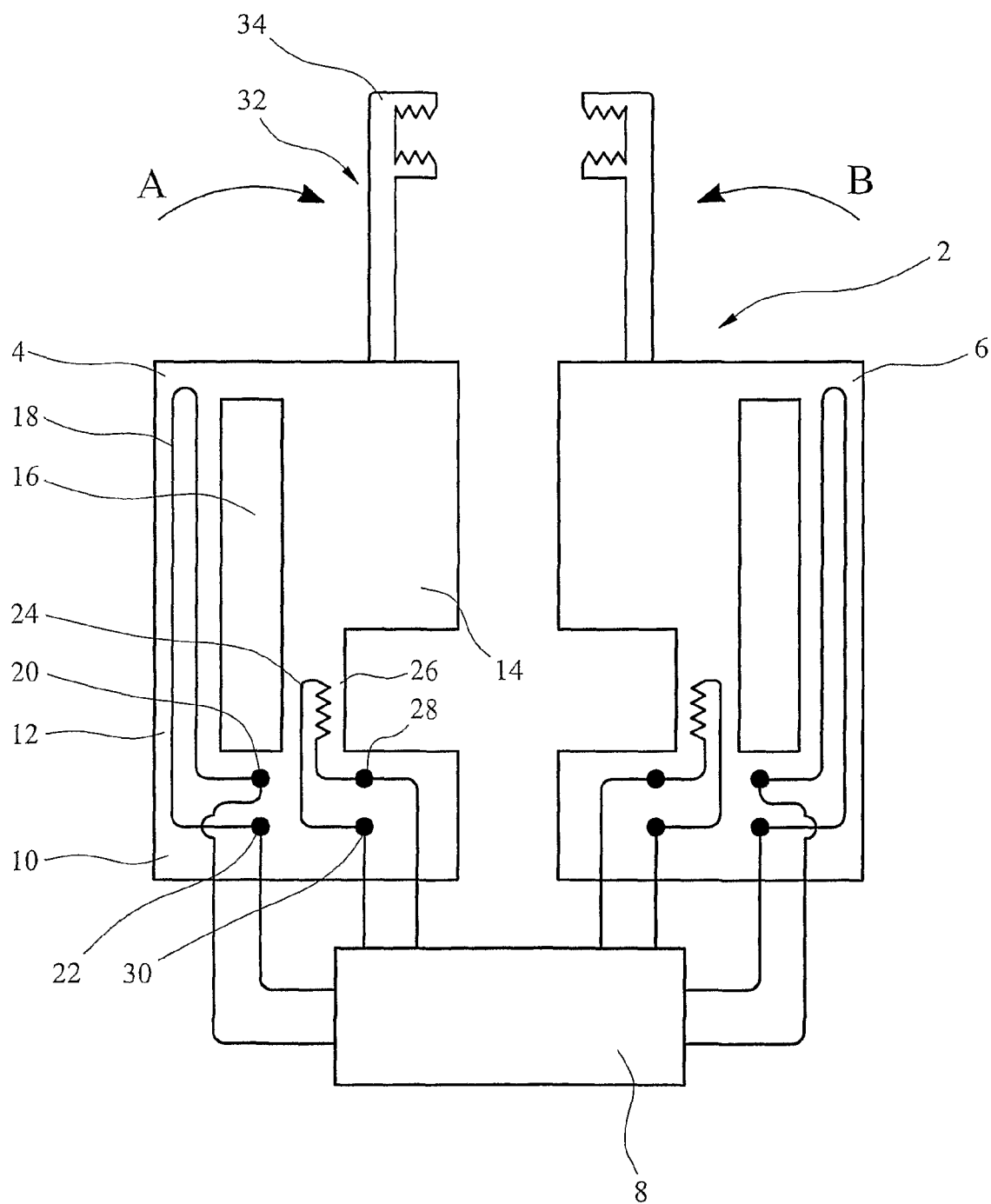
FIG. 1 is a schematic representation of an electromechanical microgripper of a first embodiment of the present invention.

Referring firstly to FIG. 1, a microgripper 2 of a first embodiment of the present invention comprises a pair of opposed actuator devices 4, 6 connected to an electronic control unit 8. Each actuator 4, 6 includes an actuator body 10 of transparent flexible epoxy based photoresist material, such as SU-8 polymer forming a "hot" arm 12 and a "cold" arm 14 joined together at their ends and separated by an aperture 16. A gold/chromium electrical heating element wire 18 is embedded in the "hot" arm 12 and is connected via electrical terminals 20, 22 to the control unit 8.

A piezoresistor 24 is embedded in a neck portion 26 of the "cold" arm 14 and is connected via electrical terminals 28, 30 to the control unit 8. The electrical resistance of the piezoresistor 24 is dependent upon the flexural stress in the neck portion 26 of the "cold" arm 14. A gripper arm 32 extends from the substrate and has a gripping portion 34 such that the gripper portions of the two gripper arms 32 face each other. It will be appreciated by persons skilled in the art that the piezoresistor 24 can be arranged in the neck portion 24 in a number of different orientations, for example parallel to or at a right angle to the direction in which the heating element 18 extends.

The operation of the microgripper 2 shown in FIG. 1 will now be described.

When electrical current is supplied via terminals 20, 22 to the heating element 18, electrical heating of the "hot" arm 12 occurs, as a result of which thermal expansion of the "hot" arm 12 causes its length to become greater than that of the "cold" arm. Because the "hot" and "cold" arms 12, 14 are joined together at their ends, the increased length of the "hot" arm 12 as a result of its thermal expansion causes the actuator bodies 10 to flex in the direction of arrows A and B, as a result of which the gripper portions 34 of the gripper arms 32 move closer together. Interruption of the electrical current supplied to the heating element 18 causes cooling of the "hot" arm, which in turn causes the gripper portions 34 to move further apart.

As a result of flexing of the actuator bodies 10, the resistance of the piezoresistors 24 changes in a manner dependent upon the flexural stress in the neck portion 26. Consequently, the resistance of the piezoresistors 24 can be measured by control unit 8 and can be used to control the position of the gripper arms 32.

Figure 2:
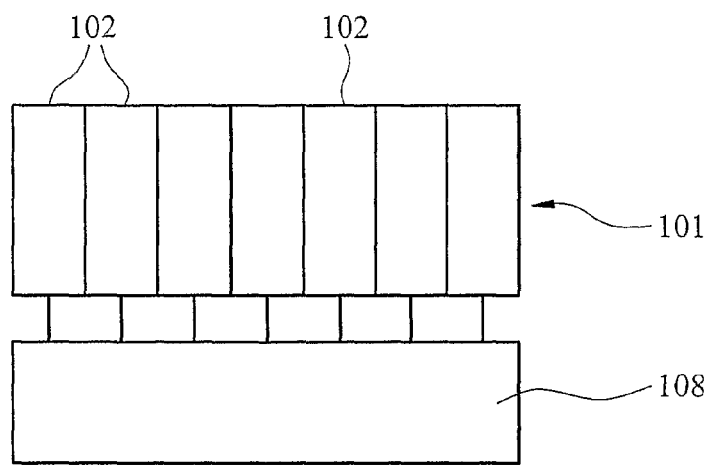
FIG. 2 is a schematic representation of an electromechanical lock of a second embodiment of the present invention.
Figure 3:
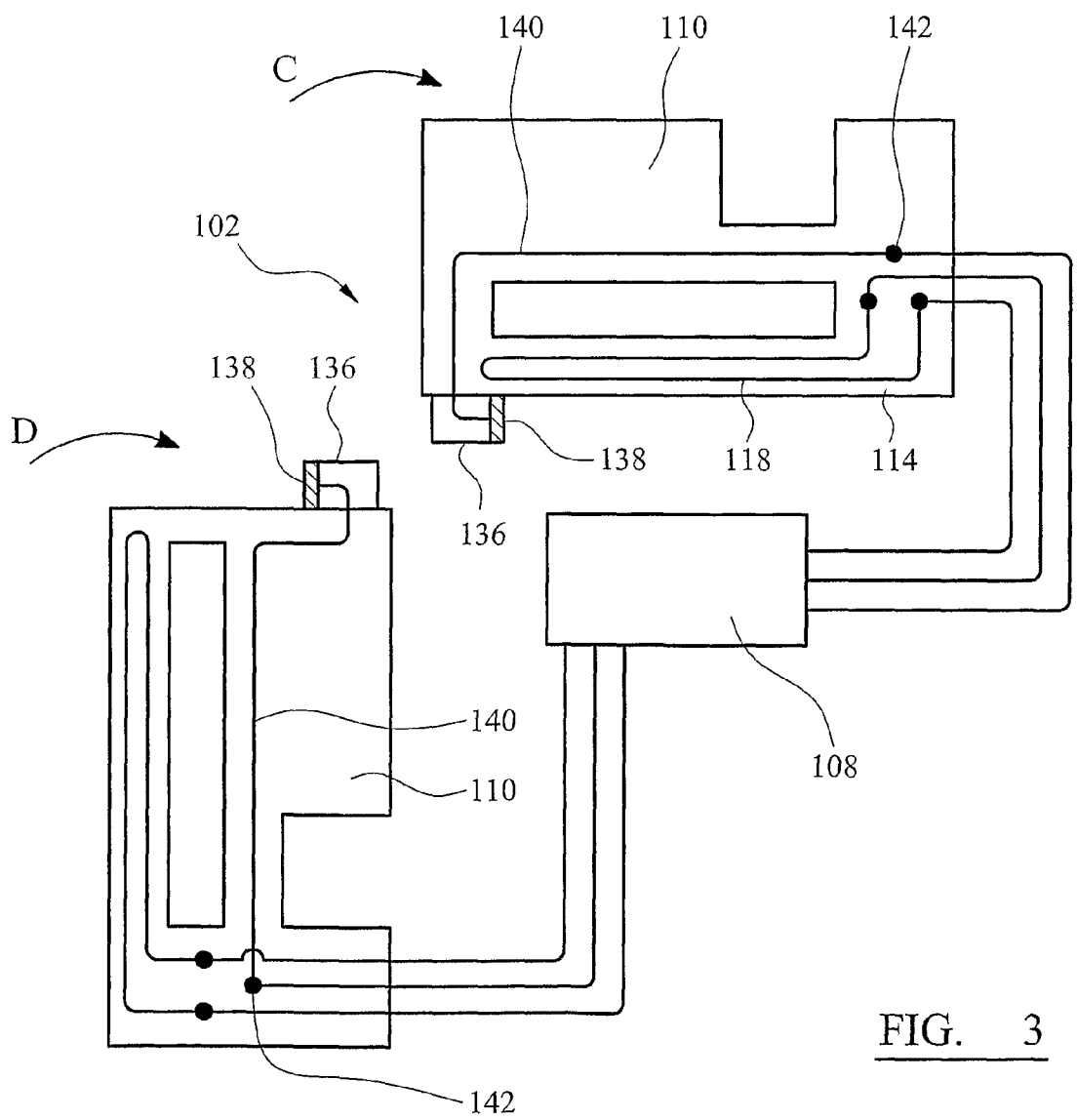
FIG. 3 is a schematic representation of an electromechanical switching device of the lock of FIG. 2.

Referring to FIGS. 2 and 3, in which parts common to the embodiment of FIG. 1 are denoted by like reference numerals but increased by 100, an electro mechanical lock 101 is provided with a series of electro mechanical switching devices 102, each of which is connected to an electronic control unit 108. Each of the electro mechanical switching devices 102 comprises a pair of actuators 104 arranged generally at right angles to each other, each actuator 104 being provided with an electrical contact 136 having an electrical contact surface 138 connected by means of a wire 140 to an electrical terminal 142, the terminals being connected to the control unit 108.

In order to establish an electrical connection between the contact surfaces 138 of the switching device 102 to enable an electrical signal to pass between the terminals 142 of each switching device 102, the electrical contact surfaces 138 need to be brought into contact with each other. This is achieved in the arrangement shown in FIG. 3 by first supplying electrical current to the upper actuator shown in the figure, to cause flexing of the actuator body 110 in the direction of arrow C to move the electrical contact 136 away from the electrical contact 136 of the other actuator 104. Electrical current is then supplied to the other actuator 104 to cause flexing of the actuator body 110 in the direction of arrow D shown in FIG. 3.

Supply of electrical current to the upper actuator 104 is then interrupted so that the actuator body 110 flexes back to its initial position, and when supply of electrical current to the other actuator 104 is subsequently interrupted, the actuator body 110 flexes in a direction opposite to arrow D to move the electrical contact surfaces 138 into contact with each other. In this way, it is only possible to establish electrical contact between the pair of contact surfaces 138 by applying electrical signals to the heating elements 118 of the actuators 104 in the correct sequence.

The electromechanical lock 101 operates such that the electronic control unit 108 only allows current to be supplied to the actuators 104 of subsequent switching devices when an electrical contact has been established between the contacts 136 of the preceding switching device 102.

Figure 4:
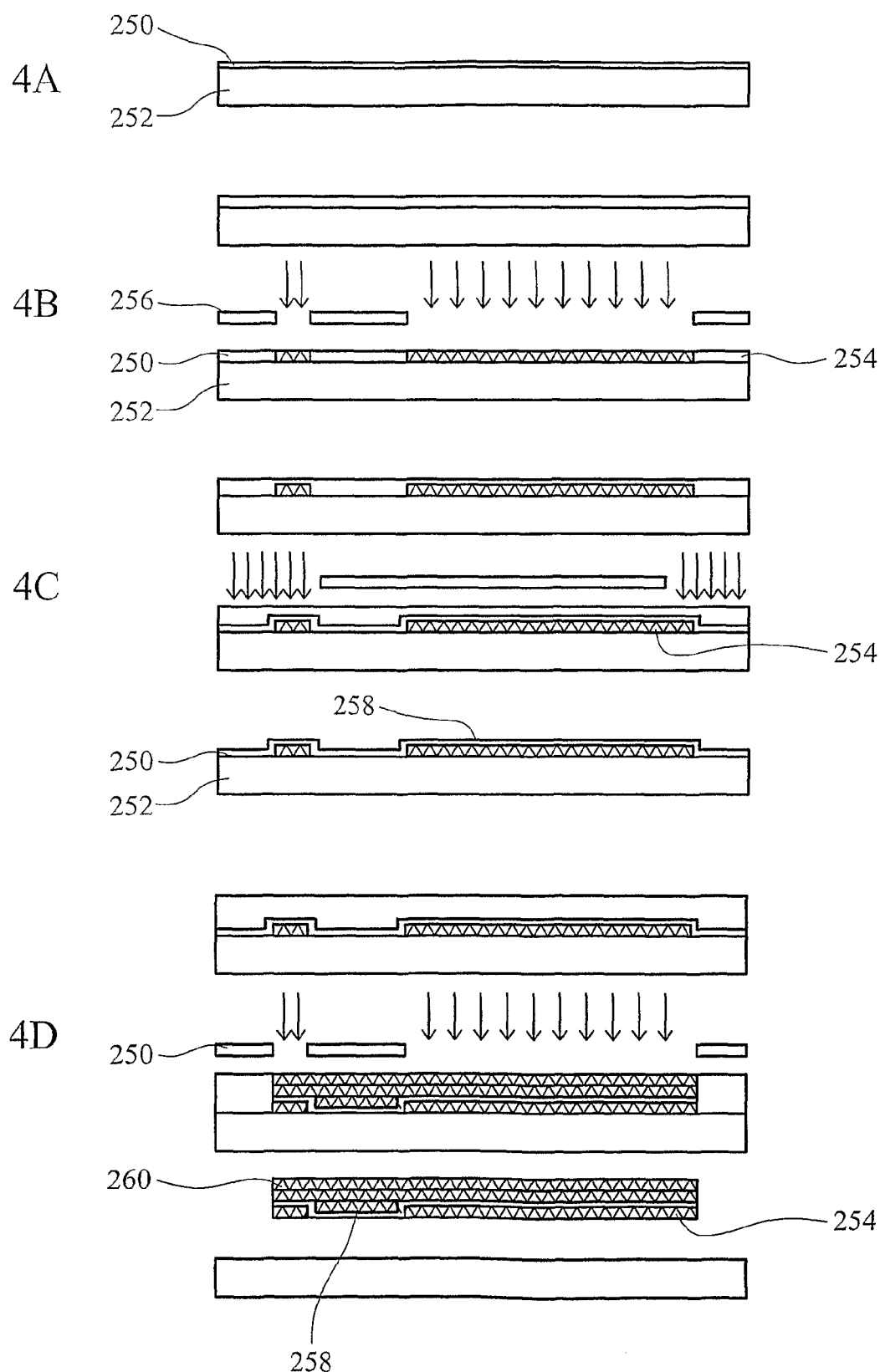
FIG. 4 shows a first process for manufacturing an actuator of the microgripper of FIG. 1.

FIG. 4 shows a first process for making the actuator 4 of the microgripper of FIG. 1, and parts common to the embodiment of FIG. 1 are denoted by like reference numerals but increased by 200.

In step 4A, a layer 250 of a material having good adhesion to polymers, for example the material provided by Microchem of Newton, Mass., USA under the brand name Omnicoat, is spin deposited on a silicon substrate 252. A layer 254 of epoxy based photoresist material such as SU-8 is then spin deposited on layer 250 in step 4B, and is patterned by means of a mask 256. In step 4C, a layer 258 of gold for forming the heating elements 18 is deposited and patterned, and then a further layer 260 of SU-8 is spin deposited in step 4D and patterned by means of a further mask 262. The structure is then allowed to cool slowly, and as the layer 260 of SU-8 is developed, it starts to peel from the substrate 252 without residual stress, the peeling being assisted by the layer 250, to provide an actuator 4 having "hot" and "cold" arms 12, 14 encapsulating an electrical heater element 18.

Figure 5:
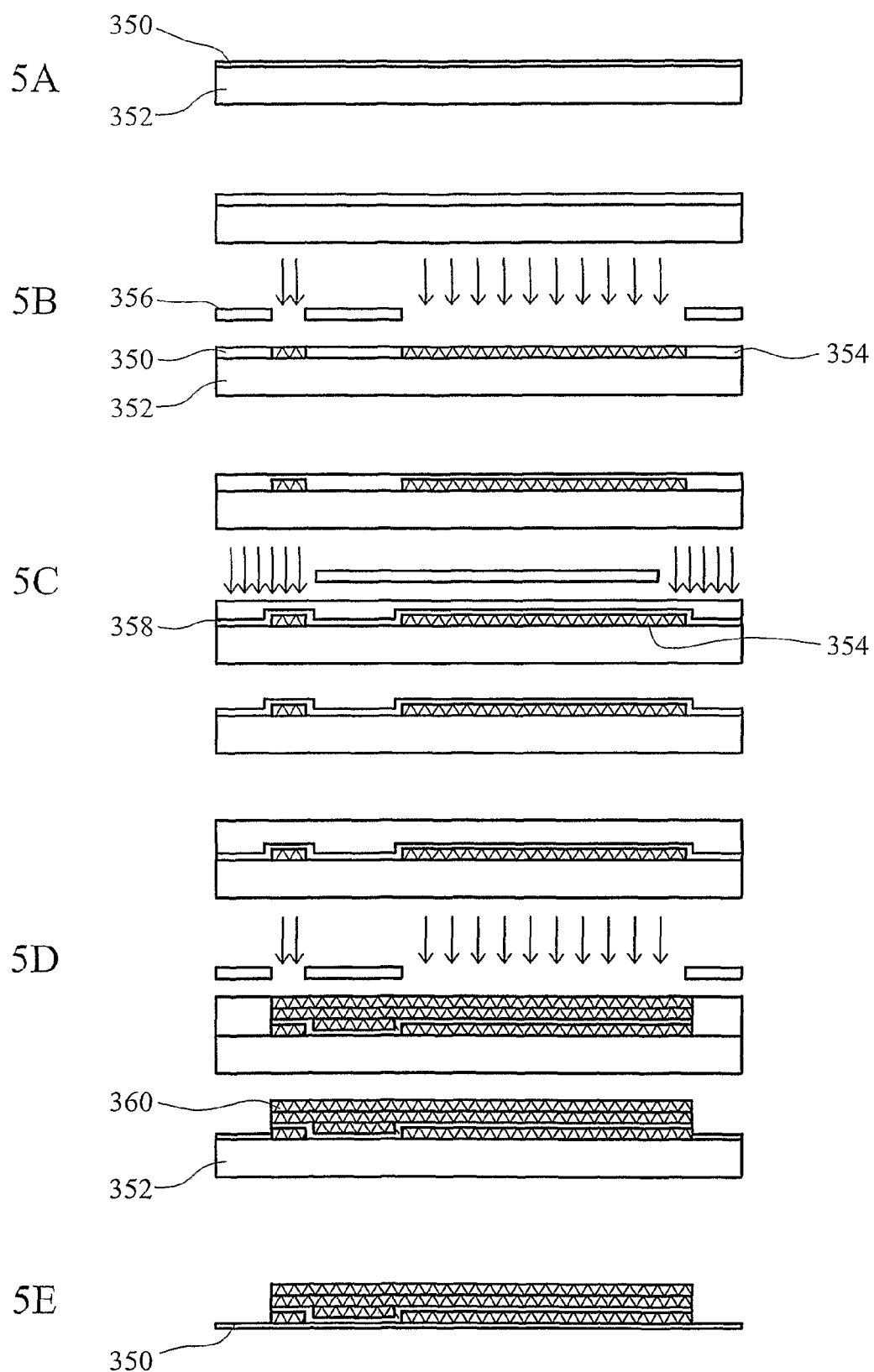
FIG. 5 shows a second process for manufacturing the actuator of the microgripper of FIG. 1.

Referring now to FIG. 5, in which parts common to the embodiment of FIG. 4 are denoted by like reference numerals but increased by 100, steps 5A to 5C are identical to steps 4A to 4C of FIG. 4 and will therefore not be described in further detail. At step 5D, a second layer 360 of SU-8 is spin deposited on the structure formed on the substrate 352, and is developed while on the substrate 352, without being allowed to cool sufficiently to enable it to detach from the substrate 352. The silicon substrate 352 is then etched away using XeF2 to leave a stress free gold/SU-8/Omnicoat structure forming actuators 4 on a backing layer 350 of omnicoat. The omnicoat layer 350 is then dry etched to release the individual actuator devices 4.

Figure 6:
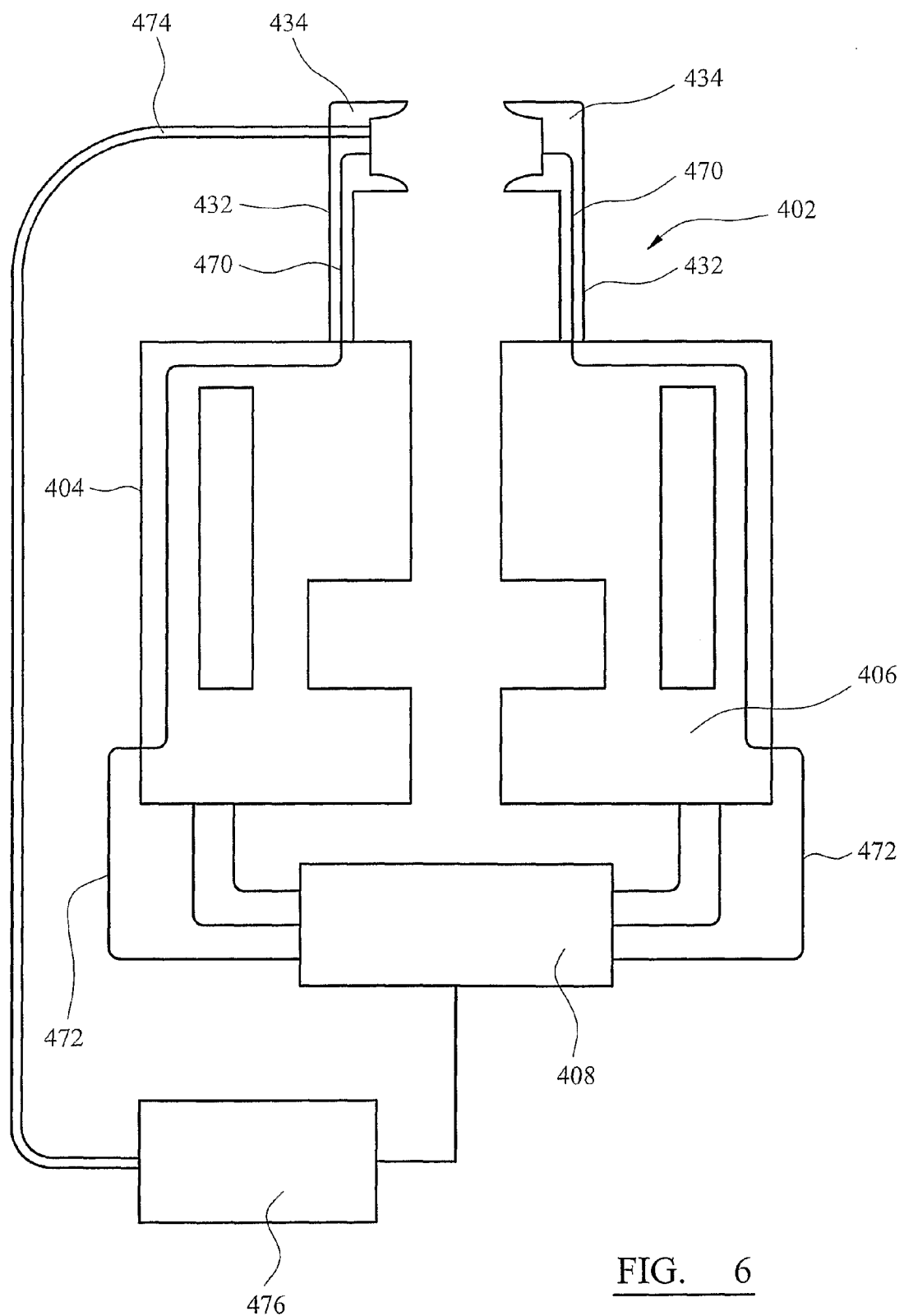
FIG. 6 shows an electromechanical microgripper of a third embodiment of the present invention.

FIG. 6 shows a microgripper 402 of a third embodiment of the present invention, and parts common to the embodiment of FIG. 1 are denoted by like reference numerals but increased by 400. The microgripper 402 has opposed actuator devices 404, 406 similar to those shown in FIG. 1 and connected to control unit 408. Each gripper arm 432 has a gripper portion 434, and is provided with a conductive electrical track 470 connected by means of a wire 472 to the control unit 408 in order to enable an electrical current in the form of a controlled electrical pulse to be delivered to a cell (not shown) held between the gripper arms 432 in order to induce a biological reaction in the cell.

One of the gripper arms 432 also carries an optical fibre 474 for enabling an optical signal to be transmitted from a laser 476 under the control of control unit 408 to a cell (not shown) held between the gripper arms 432 to induce a biological reaction or create a hole in the cell.

It will be appreciated by persons skilled in the art that the above embodiments have been described by way of example only, and not in any limitative sense, and that various alterations and modifications are possible without departure from the scope of the invention as defined by the appended claims. For example, the switching device 103 shown in FIG. 3 may operate capacitively, in which case the contact surfaces 138 do not need to come into touching contact with each other, but just need to come into close proximity to each other.

The invention claimed is:

1. An actuator device comprising:
   an actuator body including an elongate first portion and a second portion; and
   at least one electrical heater device embedded in said first portion and including at least one first electrically conductive element extending at least partially along said first portion and having first and second conductive limbs connected to each other adjacent respective first ends thereof and adapted to conduct electrical current between respective second ends thereof, wherein flow of electrical current in at least one said electrical heater device in use heats said first portion such that thermal expansion of said first portion causes said first portion to increase in length more than said second portion, and said first portion and said second portion are joined together adjacent at least respective first ends thereof such that thermal expansion of said first portion causes flexing of said actuator body towards said second portion.

2. A device according to claim 1, wherein the actuator body is at least partially transparent.

3. A device according to claim 1, wherein the actuator body is formed from a flexible material.

4. A device according to claim 1, wherein the actuator body includes epoxy based photoresist material.

5. A device according to claim 1, further comprising at least one calibration device for providing an output signal dependent upon the degree of flexing of said actuator body.

6. A device according to claim 5, wherein at least one said calibration device includes at least one second electrically conductive element having an electrical resistance dependent upon the degree of flexing of the actuator body.

7. A device according to claim 6, wherein at least one said second electrically conductive element is mounted adjacent a proximal end of said second portion.

8. A device according to claim 1, further comprising at least one gripper arm extending from said actuator body.

9. A device according to claim 8, further comprising at least one insert on a respective said gripper arm.

10. A gripper device comprising a plurality of actuator devices according to claim 8, wherein said gripper arms are adapted to grip an object therebetween, and the distance between ends of said gripper arms remote from the actuator bodies is adjustable by means of application of electrical signals to at least one said actuator device.

11. A device according to claim 10, further comprising at least one current applying device for applying an electrical current to an object gripped between said gripper arms.

12. A device according to claim 11, wherein at least one said current applying device comprises a respective electrically conductive track connected to each said gripper arm.

13. A device according to claim 10, further comprising at least one light guide device for directing a light signal onto an object gripped between said gripper arms.

14. A device according to claim 13, wherein at least one said light guide device comprises at least one optical fibre mounted to at least one said gripper arm.

15. A method of manufacturing an actuator device according to claim 1, the method comprising:
    forming a first layer of actuator body material on a substrate;
    forming at least one electrical heater device on said first layer;
    forming a second layer of actuator body material on at least one said electrical heater device; and
    separating said substrate and said first layer.

16. A method according to claim 15, further comprising forming a release layer on said substrate prior to formation of said first layer.

17. A method according to claim 16, wherein the release layer is adapted to adhere to polymer materials.

18. A method according to claim 15, wherein the step of separating said substrate and said first layer includes removal of at least part of said substrate by means of etching.

19. A device according to claim 1, wherein said actuator body comprises an insulating material.

20. A device according to claim 1, wherein said object that said gripper arms are adapted to grip therebetween is a single cell.

* * * * *